(12) United States Patent
Nakai et al.

(10) Patent No.: US 9,553,431 B2
(45) Date of Patent: Jan. 24, 2017

(54) SHIELD CONDUCTOR, AND METHOD OF MANUFACTURING A SHIELD CONDUCTOR

(71) Applicant: SUMITOMO WIRING SYSTEMS, LTD., Yokkaichi, Mie (JP)

(72) Inventors: Hirokazu Nakai, Yokkaichi (JP); Yuki Oohira, Yokkaichi (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 114 days.

(21) Appl. No.: 14/314,434

(22) Filed: Jun. 25, 2014

(65) Prior Publication Data
US 2015/0008013 A1 Jan. 8, 2015

(30) Foreign Application Priority Data
Jul. 4, 2013 (JP) .................. 2013-140913

(51) Int. Cl.
*H01R 4/00* (2006.01)
*H02G 3/06* (2006.01)
*H01R 4/02* (2006.01)
*H02G 3/04* (2006.01)

(52) U.S. Cl.
CPC ............ *H02G 3/0691* (2013.01); *H01R 4/023* (2013.01); *H01R 4/02* (2013.01); *H02G 3/0468* (2013.01); *H02G 3/0481* (2013.01); *H02G 3/0666* (2013.01); *Y10T 29/49117* (2015.01)

(58) Field of Classification Search
CPC ............. H01R 4/02; H01R 4/023; H01R 4/22; H01R 9/0527; H01R 13/59; H01R 13/512; H01R 15/043; H01R 15/504
USPC .......... 174/70 R, 72 A, 74 R, 78, 84 R, 88 R
See application file for complete search history.

(56) References Cited

U.S. PATENT DOCUMENTS

| 5,349,133 A | * | 9/1994 | Rogers | ............... H01B 11/1033 174/106 R |
| 2004/0099427 A1 | * | 5/2004 | Kihira | ................. B60L 11/1803 174/359 |
| 2006/0137893 A1 | * | 6/2006 | Sumi | .................... H01R 24/562 174/84 R |

FOREIGN PATENT DOCUMENTS

JP A-2006-311699 11/2006

* cited by examiner

*Primary Examiner* — William H Mayo, III
(74) *Attorney, Agent, or Firm* — Oliff PLC

(57) ABSTRACT

A shield conductor that shields an electrical wire includes a shield pipe and a metallic braid part that are connected together by a weld along a circumferential direction. The weld may be made by ultrasonic welding. The welding may be direct welding, or welding in which a welding member is melted and then hardened to connect the shield pipe and the metallic braid part together.

12 Claims, 3 Drawing Sheets

SHIELD CONDUCTOR, AND METHOD OF MANUFACTURING A SHIELD CONDUCTOR

This application claims the priority benefit of JP 2013-140913 filed in Japan on Jul. 4, 2013, the disclosure of which is hereby incorporated by reference in its entirety.

BACKGROUND

The present invention relates to a shield conductor, and a method of manufacturing a shield conductor.

Conventionally, in hybrid vehicles and electric vehicles, a wire harness routed between, for example, a battery and an inverter, or between an inverter and a motor is often routed through a metallic shield pipe. The shield pipe is arranged beneath a vehicle body floor along a front to rear direction. This shield pipe has a function of shielding an electrical wire and a function of protecting the electrical wire from debris. After being installed inside the engine compartment, the shield pipe is connected with an inverter side via a metallic braid part having flexibility, and is arranged to increase the degree of freedom of a routing direction of the wire harness. The metallic braid part has metallic wire braided in a mesh form, is placed over an end part of the metallic pipe, and is connected typically by caulking with a caulking ring. See, for example, Japanese Patent Application Publication No. 2006-311699.

SUMMARY

As explained above, in forming a shield conductor with a shield pipe and a metallic braid part, typically, the shield pipe and the metallic braid part are connected and fixed by caulking with a caulking ring. However, in such a connection method which uses caulking, it is difficult to make the metallic braid part contact an outer peripheral surface of the shield pipe uniformly for the entire periphery, and there is room for improvement with respect to electrical contact reliability. Also, it is to be noted that using a caulking ring increases the number of components.

The present invention was made in view of circumstances such as those discussed above and has an object of increasing the reliability of electrical contact between a metallic braid part and a shield pipe.

A shield conductor related to a first embodiment is a shield conductor through which an electrical wire can pass, and includes (i) a shield pipe and (ii) a metallic braid part that is formed by a metallic wire braided in a tubular shape. The metallic braid part and the shield pipe are connected together by welding along a circumferential direction.

Additionally, in a method of manufacturing a shield conductor related to a second embodiment, (i) an end portion of a shield pipe and (ii) an end portion of a metallic braid part that is formed by a metallic wire braided in a tubular shape are connected and fixed along a circumferential direction by direct welding, or by welding in which a welding material for connection is melted and then hardened between the shield pipe and the metallic braid part.

According to the first and second embodiments, the metallic braid part and the shield pipe are connected through a welding portion formed along the circumferential direction. Therefore, in comparison with the prior art which forms the connection by caulking with a caulking ring, the reliability of electrical contact is high, and a decrease in the number of components can be achieved.

BRIEF DESCRIPTION OF THE DRAWINGS

FIG. 2A is a view showing a state in which a metallic braid part is placed over a shield pipe and a tin coating is removed from a portion of the metallic braid part to be welded; FIG. 2B is a view showing an intermediate state in which the metallic braid part is being inverted; and FIG. 2C is a view showing a state in which the operation of connecting the metallic braid part and the shield pipe has been completed.

DETAILED DESCRIPTION OF EMBODIMENTS

Preferred embodiments of the present invention will be explained below.

(1) In a method of manufacturing a shield conductor of the present invention, a metallic wire of a metallic braid part may be copper or copper alloy, with a coating on its surface. Prior to ultrasonic welding of a shield pipe and the metallic braid part, an uncoated portion, at which there is no coating and at which the base of the metallic braid part is exposed, may be formed at the portion of the metallic braid part to be welded. This uncoated portion and the shield pipe may be connected by direct ultrasonic welding.

In general, it is difficult to ultrasonically weld a part to which a coating is applied because the ultrasonic vibrations do not sufficiently transmit if a coating is applied. However, if, prior to the welding operation, the portion of the metallic braid part to be welded is made to be uncoated and the copper or copper alloy base is exposed as described above, it becomes easy for the ultrasonic vibrations to transmit, and the metallic braid part and shield pipe can be ultrasonically welded.

(2) In the method described above, it is preferably to apply an anti-corrosion process to the uncoated portion after ultrasonic welding.

According to this type of method, the portion that was uncoated at the time of welding can be made corrosion resistant.

Next, first and second embodiments of the present invention will be described with reference to the drawings.

First Embodiment

A first embodiment of a shield conductor of the present invention will be described with reference to the drawings. In this embodiment, in a hybrid vehicle, a wire harness WH, which connects a battery mounted in the rear side of a vehicle interior to an inverter mounted in an engine compartment, is routed in a shielded manner.

Figure 1:
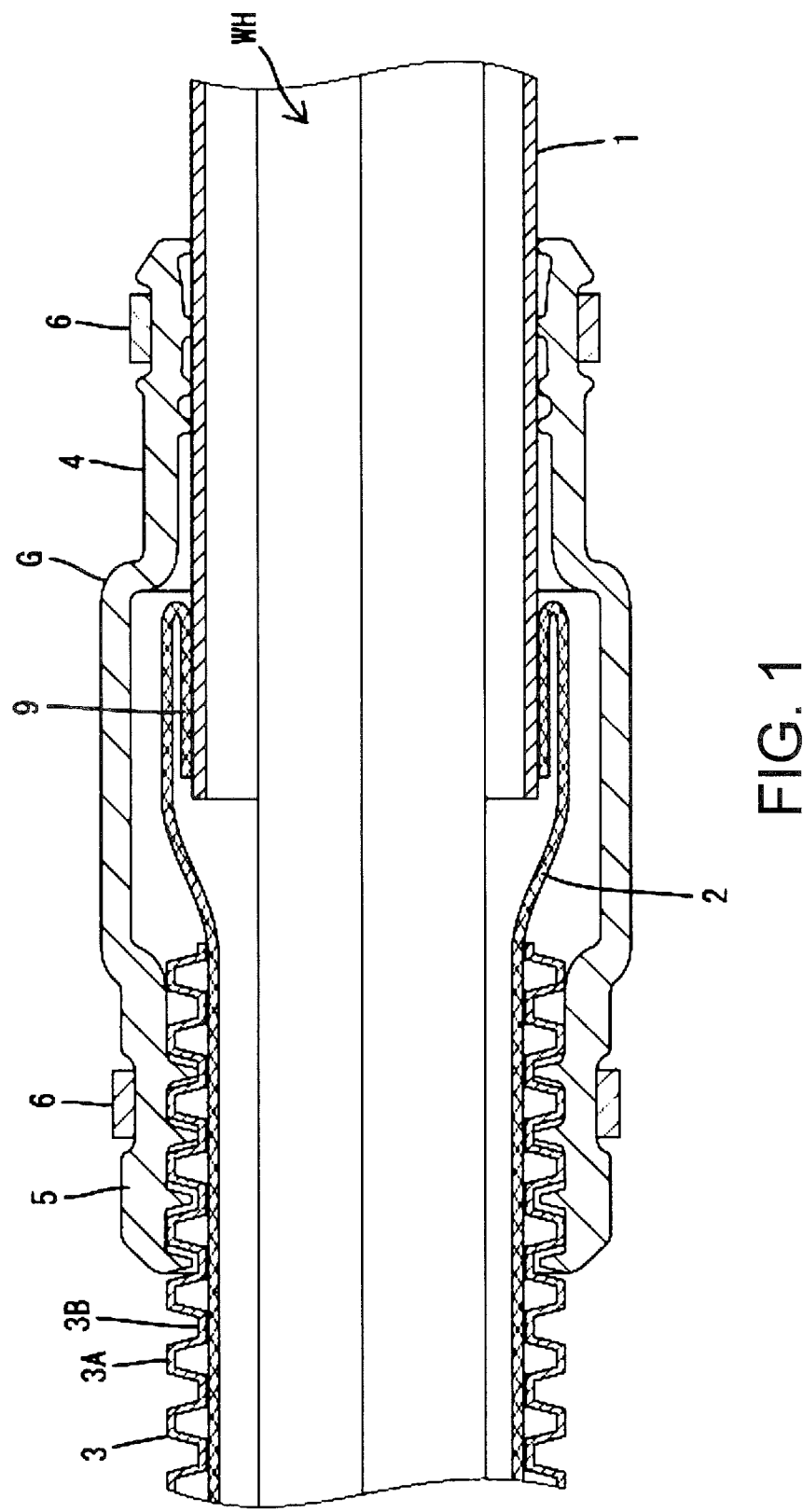
FIG. 1 is a cross-sectional view showing a periphery of a contact portion between a shield pipe and a metallic braid part according to a first embodiment.

The wire harness WH shown in FIG. 1 may be composed of one or a plurality of electrical wires. Part of the wire harness WH is inserted through an electrically conductive metallic shield pipe 1. The shield pipe 1 may be made of aluminum or aluminum alloy, and may be arranged beneath a vehicle body floor.

An end part of a metallic braid part 2 is connected to an end part of the shield pipe 1. The metallic braid part 2 may be formed, for example, by braiding copper metallic wire, provided on its surface with a tin coating, in a mesh form and in an elongated tubular form. The wire harness WH extending from the shield pipe 1 is inserted inside this metallic braid part 2. The end part of the metallic braid part 2 is connected and fixed to the end part of the shield pipe 1 by a welding method explained below.

Other than a part of the length of the metallic braid part 2 at a side connected to the shield pipe 1, the metallic braid part 2 is inserted into a corrugated tube 3, and the metallic braid part 2 extends to a part at which there is a connection to an undepicted inverter. Thus, the wire harness WH extends for the length of the shield pipe 1 and the metallic braid part 2, and shielding is ensured.

The corrugated tube 3 may be formed of synthetic resin as, for example, a one piece elongated tubular member. A peripheral surface of the corrugated tube 3 may be formed in an accordion shape with repeating convex parts 3A and concave parts 3B, and has good flexibility. A grommet G that houses the metallic braid part 2 that is exposed from the corrugated tube 3 may be mounted so as to bridge between the corrugated tube 3 and the shield pipe 1.

The grommet G may be formed as a one piece member from, for example, rubber material (for example, EPDM). A pipe side end part 4 is formed at one end of this grommet G, and a corrugated side end part 5 is formed at another end. The pipe side end part 4 and the corrugated side end part 5 are both formed in a tubular shape. The pipe side end part 4 can have the end part of the shield pipe 1 inserted inside, and the corrugated side end part 5 can pass over an outer peripheral side of the corrugated tube 3. Outer peripheral surfaces of the pipe side end part 4 and the corrugated side end part 5 may both be secured by a well-known uniting band 6, whereby the corrugated side end part 5 is connected and fixed in a sealed state with respect to the corrugated tube 3, and the pipe side end part 4 is connected and fixed in a sealed state with respect to the shield pipe 1.

Next, an example of a method of connecting the metallic braid part 2 and the shield pipe 1 will be described (see FIGS. 2A to 2C).

Figure 2A:
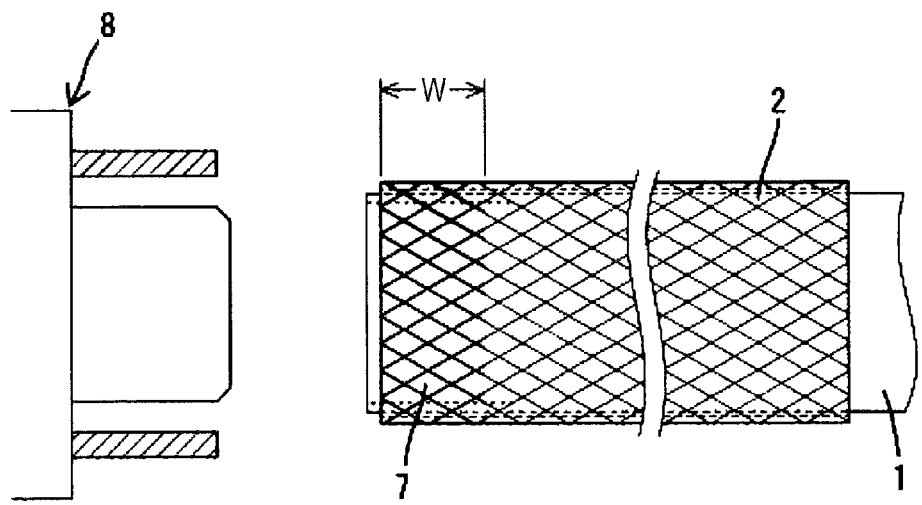
FIGS. 2A to 2C are views showing an exemplary process of connecting a metallic braid part and a shield pipe.
Figure 2B:
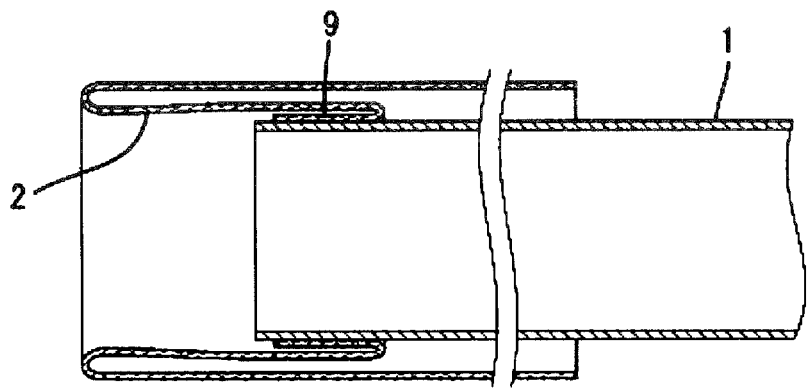
Figure 2C:
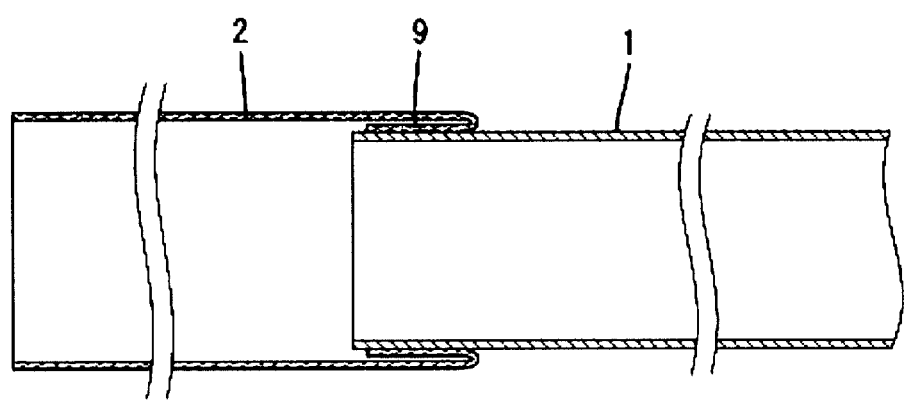

As described above, a tin coating may be applied to each metallic wire of the metallic braid part 2, but prior to welding, an uncoated portion 7 may be formed at the portion of the metallic braid part 2 that is to be welded to the shield pipe 1 (an end portion, in the longitudinal direction, of the metallic braid part 2: the range shown by "W" in FIG. 2A), and the copper base may be exposed. Conceivable techniques for forming the uncoated portion and exposing the copper base include (i) a technique in which, when the coating process is performed to the metallic braid part 2, a tin coating is caused to attach to the metallic braid part 2 except for the part to be welded, and (ii) a technique in which a tin coating is applied to the entire metallic braid part 2, including the part to be welded, and thereafter an acid treatment is applied to the part to be welded, removing the tin coating from just that part.

After the uncoated portion 7, at which there is no tin coating, is thus formed at the part to be welded, an entire length of the metallic braid part 2 is placed over the shield pipe 1 along a longitudinal direction, and the uncoated portion 7 is positioned at an end of the shield pipe 1 (see FIG. 2A). At this time, it is preferable that a terminal end part of the metallic braid part 2 does not protrude from an end surface of the shield pipe 1 in a longitudinally outward direction. The reason for this is to avoid damaging a cover of the electrical wires which form the wire harness WH by the terminal end of the metallic braid part 2 protruding from the shield pipe 1.

In a state in which the metallic braid part 2 has thus been placed over the shield pipe 1, the assembly is set to an ultrasonic welding device 8, and ultrasonic vibration is caused to act at a position at which the uncoated portion 7 and the outer peripheral surface of the end part of the shield pipe 1 are in close contact. By so doing, the uncoated portion is welded to the outer peripheral surface of the end part of the shield pipe 1. After the welding is completed in this manner, the metallic braid part 2 is inverted about the welded portion 9 so as to be removed from the shield pipe 1 (see FIG. 2B). The metallic braid part 2 is fully removed from the shield pipe 1, and an anti-corrosion process may be applied to the uncoated portion 7. Conceivable anti-corrosion processes include (i) coating a silicon agent over the entire uncoated portion 7, including the welded portion, and (ii) winding tape around the entire uncoated portion 7, including the welded portion. Thus, the operation of connecting the shield pipe 1 and the metallic braid part 2 is completed (the state shown in FIG. 2C).

According to the shield conductor of the present embodiment manufactured in the manner described above, even if a caulking ring is not used as in the prior art, it is possible to connect the metallic braid part 2 with the shield pipe 1 by welding across the entire periphery. In contrast to this, even if they are secured using a caulking ring as in the prior art, the roundness of the caulking ring is not necessarily maintained in the caulked condition, and both members are not attached uniformly across the entire periphery. Thus, there has been room for improvement with respect to electrical connection reliability. However, if the metallic braid part 2 and the shield pipe 1 are ultrasonically welded as in the present embodiment, the metallic braid part 2 and the shield pipe 1 can be connected such that they are in close contact across the entire periphery, and therefore the reliability of electrical connection can be increased and inconsistencies in the connection quality can be suppressed. Also, because no caulking ring is necessary, the number of parts can be reduced.

In addition, in the present embodiment as described above, the end part of the metallic braid part 2 is folded to the inner side and the terminal end of the metallic braid part 2 does not protrude outwardly, and thus there is no need to carry out a terminal end process to address unraveling of the wire terminal end of the metallic braid part 2. Naturally, when using ultrasonic welding as in the present embodiment, the welding can be performed on the terminal end of the metallic wire as well, and thus the problem of the metallic wire unraveling does not even arise.

Second Embodiment

Figure 3:
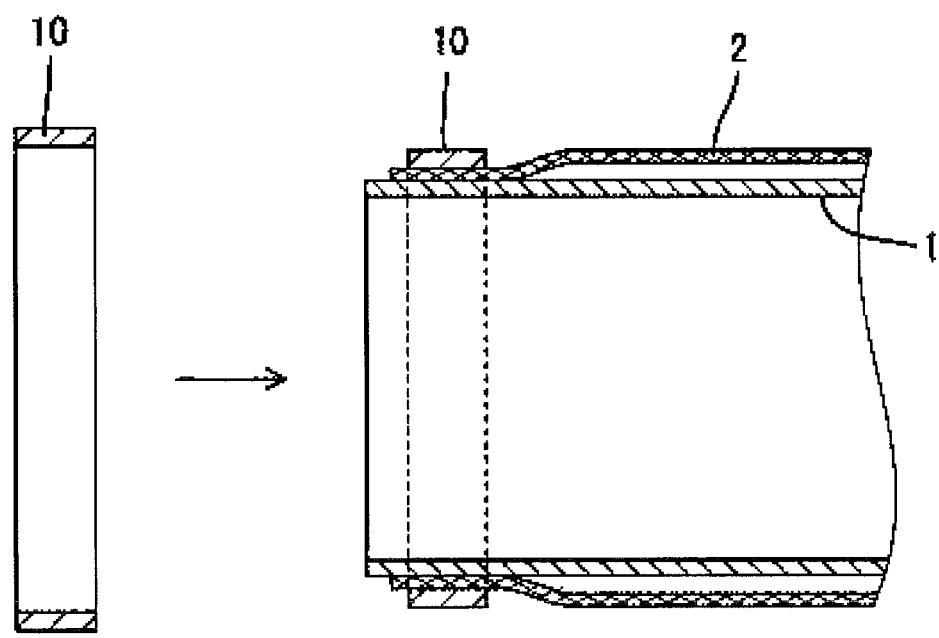
FIG. 3 shows part of a manufacturing method according to a second embodiment.

FIG. 3 shows a second embodiment. In the first embodiment, the metallic braid part 2 and the shield pipe 1 were directly welded, but in the second embodiment, a metallic ring 10 for welding (corresponding to a welding member for connection of this invention) is set on the metallic braid part 2 prior to the welding operation, and the metallic braid part 2 and the shield pipe 1 are welded by melting the metallic ring 10 by ultrasonic welding or the like.

The material of the metallic ring 10 can be selected from among materials weldable to the shield pipe 1, including, for example, aluminum, aluminum alloys, copper, and copper alloys. The metallic ring 10 may be melted by an ultrasonic welding process, and flows through the mesh of the metallic braid part into spaces between the metallic braid part 2 and the shield pipe 1. When the melted metal hardens, the metallic braid part 2 and the shield pipe 2 are connected and fixed together.

It is acceptable, but not necessary, to perform tin coating removal on the metallic braid part 2, as was done in the first embodiment, prior to ultrasonic welding. With the welding method of the second embodiment as well, operational effects can be achieved that are similar to those in the first embodiment.

Other Embodiments

The present invention is not limited to the embodiments described in the above explanations and the figures, but embodiments such as the following, for example, are encompassed by the technical scope of this invention.

(1) In the above described embodiments, ultrasonic welding is described as an example of a welding method to connect the shield pipe 1 and the metallic braid part 2, but this can be replaced by resistance welding, soldering or the like.

(2) Prior to ultrasonic welding, if an oxide coating is removed from a surface of the shield pipe 1 at the location to be welded, the weldability can be further increased.

(3) In the above-described embodiments, the case is described in which a tin coating is applied to the metallic braid part, but it is also suitable to apply a nickel coating, or any other suitable coating.

What is claimed is:

1. A shield conductor through which an electrical wire can pass, the shield conductor comprising:
   a shield pipe; and
   a metallic braid part, the metallic braid part being formed by a metallic wire braided in a tubular shape,
   wherein the metallic braid part and the shield pipe are connected to each other by a weld along a circumferential direction, and a portion of the metallic braid part is in an inverted state and covers the weld.

2. The shield conductor of claim 1, wherein the weld is along an entire periphery of the shield pipe and of the metallic braid part.

3. The shield conductor of claim 1, wherein the metallic wire of the metallic braid portion is of copper or copper alloy.

4. The shield conductor of claim 3, further comprising a coating on a surface of the metallic wire, the coating being of a material other than copper or copper alloy.

5. The shield conductor of claim 1, further comprising a coating on a surface of the metallic wire.

6. A method of manufacturing a shield conductor through which an electrical wire can pass, the method comprising:
   welding together, along a circumferential direction, (i) an end portion of a shield pipe and (ii) a metallic braid part that is formed by a metallic wire braided in a tubular shape; and
   inverting a portion of the metallic braid part so as to cover the weld and the end portion of the shield pipe.

7. The method of claim 6, wherein the welding is performed along an entire periphery of the shield pipe and of the metallic braid part.

8. The method of claim 6, wherein the welding comprises direct welding.

9. The method of claim 6, wherein the welding comprises melting a welding member for connection and then hardening material of the melted welding member between the shield pipe and the metallic braid part.

10. The method of claim 6, wherein the metallic wire of the metallic braid portion comprises (i) a base material and (ii) a coating on the base material, the method further comprising:
    prior to welding the shield pipe and the metallic braid portion, forming an uncoated portion, at which there is no coating and at which the base material is exposed, at a portion of the metallic braid part to be welded;
    wherein the welding connects the uncoated portion and the shield pipe together.

11. The method of claim 10, further comprising applying an anti-corrosion process to the uncoated portion after welding.

12. The method of claim 6, wherein the welding comprises ultrasonic welding.

\* \* \* \* \*